July 10, 1962 A. C. EICHMANN 3,043,614
LOAD RELEASING LOCK-ON COUPLING
Filed June 30, 1961
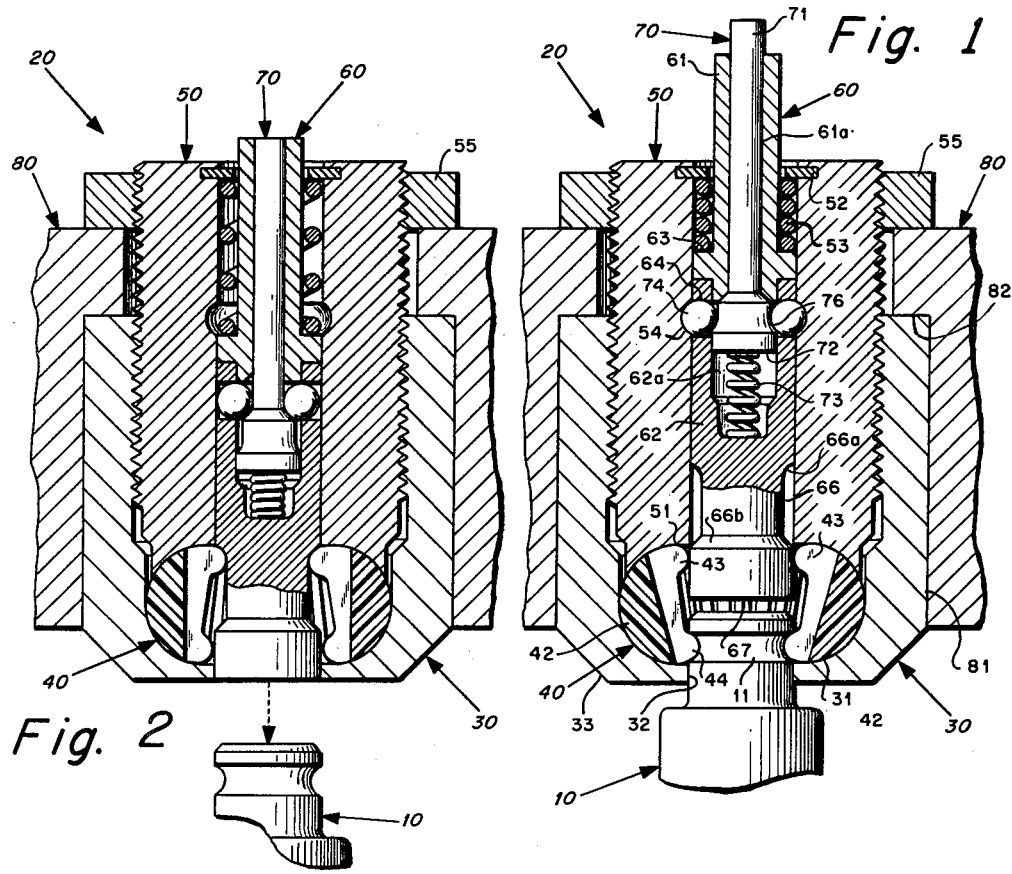
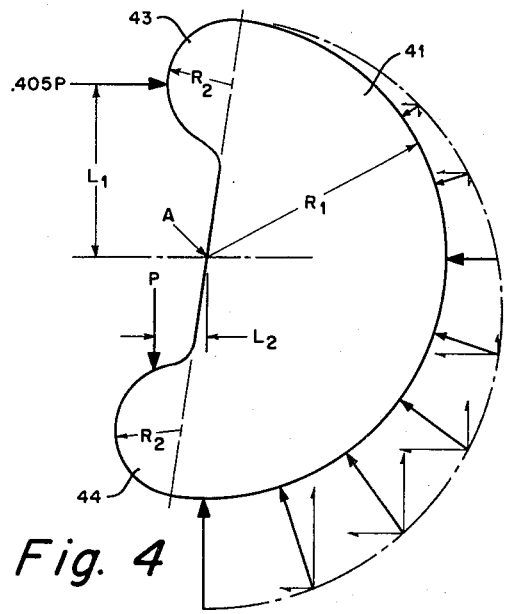
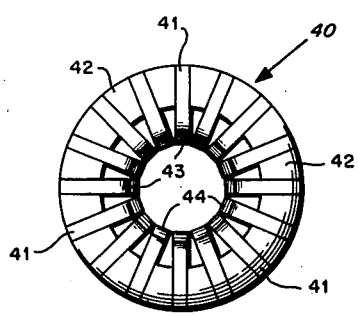
INVENTOR.
ALBERT C. EICHMANN
BY
ATTORNEY

3,043,614
LOAD RELEASING LOCK-ON COUPLING

Albert C. Eichmann, Bethayres, Pa., assignor to the United States of America as represented by the Secretary of the Navy
Filed June 30, 1961, Ser. No. 121,260
8 Claims. (Cl. 287—119)
(Granted under Title 35, U.S. Code (1952), sec. 266)

The invention described herein may be manufactured and used by or for the Government of the United States of America for governmental purposes without the payment of any royalties thereon or therefor.

The present invention relates to a mechanical coupling and more particularly to a mechanical coupling which may be used to secure one item to another and which includes provision for separation of the items under load.

The coupling of the present invention may be used universally for attaching, holding, tieing-down, hoisting, suspending, and releasing loads. However, the coupling is particularly useful in the stowage and handling of aircraft borne weapons and stores and for securing weapons and stores to appropriate supporting structure in or on an aircraft.

Weapons and stores carried by modern aircraft vary greatly in size, weight, and configuration. Known apparatus used to secure these items to storage racks, carriers, or aircraft have generally been designed to accommodate a specific weapon or store. Further, various and differing apparatus and devices have been used to restrain or support each weapon or store in the various stages of the stowage and handling process and in mounting the weapon or store in or on an aircraft.

In addition to requiring a large inventory, use of prior art apparatus and devices is unduly time-consuming resulting in extending the time required to rearm aircraft thereby reducing the number of aircraft available for assigned missions. This deficiency is particularly serious in connection with the turn-around time required for carrier based aircraft where the total number of available aircraft is necessarily restricted.

In addition to the aforementioned disadvantages, apparatus and devices used for the purposes discussed above are unduly bulky, complex, and expensive.

The present invention overcomes the above-noted and other disadvantages of prior art apparatus and devices by providing a simple, compact, inexpensive, and reliable coupling capable of supporting large loads in proportion to its size and weight and which is further characterized by being adapted for use as a securing element in every stage of the weapons and stores stowage, handling, and loading process.

It is therefore a principal object of the present invention to provide a simple, compact inexpensive, and reliable mechanical coupling device adapted for universal use in securing one item to another with provision for separation of the items under load.

It is another object of the present invention to provide a mechanical coupling device of the character described in the preceding object which is particularly adapted to perform securing and supporting functions in the stowage, handling, and loading of aircraft borne weapons and stores.

Other objects and many of the attendant advantages of this invention will be readily appreciated as the same becomes better understood by reference to the following detailed description when considered in connection with the accompanying drawings wherein:

FIG. 1 is a view in cross section showing an embodiment of the coupling device in a loaded condition;

FIG. 2 is a similar view in cross section showing the device in an unloaded condition;

FIG. 3 is a plan view of a sprag assembly used in embodiments of the invention; and FIG. 4 illustrates the manner in which forces act upon a sprag in a loaded condition.

Referring now to FIGS. 1 and 2 it may be seen that the coupling device of the present invention generally comprises a lock-on stud 10 adapted to be received through an aperture 32 in a connector, generally indicated by the reference number 20.

Connector 20 includes a shear cap 30 adapted to be received wholly or partly within an aperture 81 formed within a supporting structure 80 and abutting a shoulder portion 82 thereof. Supporting structure 80 may comprise, for example, a storage rack, a dolly, or a bomb rack.

Shear cap 30 may be retained within aperture 81 by a thumb nut 55 threaded onto a hollow shaft 50 which is in turn threaded into shear cap 30.

Stud 10 may be received within a shallow recess formed within a weapon or store W (not shown) and affixed thereto by any convenient means such as by welding. In some instances it may be desirable to fabricate the stud portion of the coupling as a cup-shaped member which may be threaded into a shallow threaded bore formed in the surface of the weapon or store.

It is to be understood that in use shear cap 30 may be received at least partially within the stud recess mentioned above, whereby lateral shear may be absorbed by the cap. Shear cap 30 may be chamfered as indicated by the reference numeral 33 in order to aid the coupling operation. Further, in some instances it may be desirable to form aperture 81 so as to have a slightly larger diameter than that of shear cap 30 and to interpose a stabilizing spring between shear cap 30 and shoulder 82 to facilitate the coupling operation.

Continuing with the description of FIGS. 1 and 2, a sprag assembly 40 is received within shear cap 30 and abuts lip portion 31 thereof adjacent aperture 32 in closely interfitting relationship, and is loosely held in this position by end portion 51 of hollow shaft 50. End portion 51 and lip portion 31 are shaped to accord with the configuration of sprag assembly 40.

Referring briefly to FIGS. 3 and 4, it will be seen that sprag assembly 40 comprises a plurality of metal sprags 41 which, referring particularly to FIG. 4, each have a semi-circular body portion of radius $R_1$ terminating in opposed semi-circular lip portions 43, 44 of radii $R_2$. The interstices between the sprags are partially filled by segments 42 of a flexible material having good surface characteristics, such as polyurethane, to form a generally annular assembly wherein sprags 41 are free to rotate to a limited extent about an annular axis A but are restrained against movement in other directions by segments 42, shear cap 30, and hollow shaft 50.

Sprags 41 may be stamped from sheet stock and the sprag assembly may be fabricated by molding or by any other convenient process.

Referring again to FIGS. 1 and 2, in the loaded condition, lip portions 44 abut and closely interfit an annular groove 11 formed in stud 10 and are held in this position by the abutment of lip portions 43 against a cylindrical end portion 67 of a plunger assembly 60 received within hollow shaft 50.

Plunger assembly 60 comprises an upper portion 61 and a lower portion 62 respectively having bores 61a, 62a, and 64 therein. In one embodiment of the invention, plunger 60 is biased for travel in the direction of stud 10 by a spring 53 interposed between a retaining ring 52 and shoulder 63 of plunger portion 61 but is held against movement by a plunger detent and release assembly 70.

Plunger detent and release assembly 70 comprises an operating member 71 received within bore 61a and biased to the position shown by a spring 73 interposed between end portion 72 thereof and the bottom of bore 62a. A pair of ball detents 74 are supported for lateral movement within bore 64. In the spring biased position a camming surface 76 on operating member 71 retains ball detents 74 in contact with an annular recess 54 formed in hollow shaft 50 to prevent downward movement of plunger 60 in response to the force applied thereto by spring 53.

When it is desired to release stud 10, operating member 71 is depressed against the bias of spring 73. As the operating member is depressed, ball detents 74 roll along camming surface 76 until a reduced diameter portion of member 71 is encountered. At this point, the ball detents are free to travel inward and are cammed in this direction by forces derived from spring 53 and applied thereto, as a couple, by recess 54 and the upper wall of bore 64. When ball detents 74 are cammed out of engagement with annular recess 54, plunger assembly 60 is free to travel abruptly in the direction of stud 10 in response to the force applied to shoulder 63 by spring 53. After a short period of travel by plunger 60, lip portions 43 of sprag assembly 40 communicate with a reduced diameter portion 66 of plunger assembly 60. Further movement of plunger 60 causes end portion 67 thereof to impact upon the head of stud 10. Camming forces are applied by groove 11 upon lip portions 44 of sprag assembly 40, whereupon sprags 41 disengage from stud 10 permitting the release thereof.

The hammer-like action imparted by plunger 60 upon stud 10 assures positive separation of the stud from the connector.

Continued travel by plunger 60 is prevented by the abutment of plunger surface 66a upon lip portions 43 of sprags 41. As best seen in FIG. 2, in preferred embodiments of the invention, plunger 60 comes to rest with end portion 67 thereof closing aperture 32 to provide shear cap 30 with a flush exterior and to prevent the entrance of dirt, moisture, or other foreign material into connector 20.

Coupling of stud 10 to connector 20 is accomplished by inserting the head thereof through aperture 32 thereby raising plunger 60 against the bias of spring 53. When plunger 60 has traveled a short distance surface 66b of plunger 60 engages lip portions 43 of sprag assembly 44 and by cam action rotates sprag links 41 to engage lip portions 43 with groove 11 in stud 10. Slight further movement of plunger 60 causes ball detents 74 to engage annular recess 54 to restore the coupling to the condition shown in FIG. 1 and initially described.

Before proceeding further with the description of the coupling, it should be noted that, if desired, some simplification may be effected in the construction of plunger 60. For some applications of the coupling it may be desirable to eliminate plunger detent and release assembly 70. In these embodiments, plunger 60 may be provided with a cap and a spring may be provided and disposed between the cap and the upper surface of hollow shaft 50 to bias the plunger away from engagement with stud 10. When the coupling is so constructed, release of the stud is accomplished by depressing the plunger into engagement with stud 10 against the bias provided by the spring. Operation of the device is otherwise similar to that described above.

By further reference to FIGS. 3 and 4, sprag assembly 40 will be more fully discussed.

Known article retaining structures, such as ball-detents and claws are characterized by providing a relatively small area of contact with the article to be retained in proportion to the size of the retaining structure and the number of retaining elements provided therein. Further, since the surface of the retained article engaged by the retaining members and the surface of the reaction member, as conventionally provided, are substantially in line in prior art devices, wearing of parts soon reduces the effectiveness of these devices.

It will be apparent by reference to FIGS. 3 and 4, that the configuration of sprags 41, in the annular sprag assembly shown in FIG. 3, makes it possible for the lip portions 44 thereof to form a nearly continuous surface contact with groove 11 in stud 10 when the thickness of each sprag is kept to a minimum consistent with strength requirements to thereby permit the provision of a maximum number of sprags in the allotted space. In proportion to sprag assembly size, maximum article engaging and article retaining surface is thus provided.

By reference to FIGS. 1 and 4, it will be seen that a couple is generated about annular axis A between lip portions 44, engaging groove 11, and lip portions 43, engaging plunger 60. This feature of the invention permits reaction forces to be distributed between the mating surfaces of sprags 41, plunger 60, shaft 50, and shear cap 30 as shown by the vector force diagram of FIG. 4. In addition, coupling of forces from stud 10 to plunger 60 permits self-alignment of sprags 41 to thereby automatically distribute the load between them.

While the specific sprag assembly described above and illustrated in FIG. 3 has many advantages, it is to be understood that other means of assembling sprags 41 into an annular structure are contemplated. For example, sprags 41 may be retained in an operative position by a retaining ring disposed in a plane parallel to aperture 32 and in contact with the centers of rotation of sprags 41 to thus define the annular axis A.

There has been disclosed above embodiments of a coupling device that are simple, compact, inexpensive, and reliable and which are capable of supporting large loads in proportion to the size of the coupling. Further, the coupling device of the invention is adapted for universal use to perform securing functions. In addition, the arrangement and the structure of the parts of the coupling device permit ready disassembly and assembly to thus facilitate initial construction as well as maintenance when required.

It should be understood, of course, that the foregoing disclosure relates only to preferred embodiments of the invention and that numerous modifications or alterations may be made therein without departing from the spirit and the scope of the invention as set forth in the appended claims.

What is claimed is:

1. A mechanical coupling comprising: a connector including a cap having a cylindrical bore therein terminating in an aperture smaller than said bore, a sprag assembly received within said cap adjacent said aperture, said sprag assembly comprising a plurality of planar sprags each having a semi-circular body portion terminating in opposed semi-circular lip portions of radii less than that of said body portion, and means assembling said sprags to form an annulus wherein the sprags are free to rotate about an annular axis passing through the axes of said body portions, a hollow shaft received within said cap and having an end portion abutting said sprag assembly, and a cylindrical plunger received within said hollow shaft spring biased for movement along the axis thereof, said plunger having an annular elongated groove therein near the end portion thereof adjacent said sprag assembly, whereby in one displaced position the end portion of said plunger is received within and abuts one lip portion of said sprag assembly to rotate and maintain said sprags in an article engaging position and whereby in another displaced position of said plunger said one lip portion of said sprag assembly is received within said elongated groove to permit said sprags to rotate to an article disengaging position.

2. A mechanical coupling comprising: a connector including a cap having a cylindrical bore therein terminating in an aperture smaller than said bore, a sprag assembly received within said cap adjacent said aperture, said sprag assembly comprising a plurality of planar sprags each having a semi-circular body portion terminating in opposed semi-circular lip portions of radii less than that of said body portion, said sprags being equally spaced about an annular axis passing through the axes of said body portion with the interstices therebetween being partly filled with a flexible material having good surface adhesion characteristics, a hollow shaft received within said cap and having an end portion abutting said sprag assembly, and a cylindrical plunger received within said hollow shaft spring biased for movement along the axis thereof, said plunger having an annular elongated groove therein near the end portion thereof adjacent said sprag assembly, whereby in one displaced position the end portion of said plunger is received within and abuts one lip portion of said sprag assembly to rotate and maintain said sprags in an article engaging position and whereby in another displaced position of said plunger said one lip portion of said sprag assembly is received within said elongated groove to permit said sprags to rotate to an article disengaging position.

3. The combination of claim 2 wherein said plunger is provided with a longitudinal bore communicating with a lateral bore, and wherein there is further provided a plunger detent and release assembly comprising a ball detent disposed within said lateral bore and adapted to engage an annular recess in said hollow shaft, and a spring biased detent release member disposed in said longitudinal bore.

4. A mechanical coupling comprising: a connector including a cap having a cylindrical bore therein terminating in an aperture smaller than said bore, a sprag assembly received within said cap adjacent said aperture, said sprag assembly comprising a plurality of planar sprags each having a semi-circular body portion terminating in opposed semicircular lip portions of radii less than that of said body portion, and means assembling said sprags to form an annulus wherein the sprags are free to rotate about an annular axis passing through the axes of said body portions, a hollow shaft received within said cap and having an end portion abutting said sprag assembly, a cylindrical plunger received within said hollow shaft spring biased for movement along the axis thereof, said plunger having an annular elongated groove therein near the end portion thereof adjacent said sprag assembly, whereby in one displaced position the end portion of said plunger is received within and abuts one lip portion of said sprag assembly to rotate and maintain said sprags in an article engaging position and whereby in another displaced position of said plunger said one lip portion of said sprag assembly is received within said elongated groove to permit said sprags to rotate to an article disengaging position; and a cylindrical lock-on stud having one end thereof adapted to be secured to a weapon or store and having an annular semi-circular groove formed therein adjacent the other end thereof, the radius of said groove being approximately equal to that of the lip portions of said sprag assembly, said lock-on stud being adapted to be received through said cap aperture whereby said groove abuts and closely interfits with the other lip portion of said sprag assembly.

5. A mechanical coupling comprising: a connector including a cap having a cylindrical bore therein terminating in an aperture smaller than said bore, a sprag assembly received within said cap adjacent said aperture, said sprag assembly comprising a plurality of planar sprags each having a semi-circular body portion terminating in opposed semi-circular lip portions of radii less than that of said body portion, said sprags being equally spaced about an annular axis passing through the axes of said body portion with the interstices therebetween being partly filled with a flexible material having good surface adhesion charactertistics, a hollow shaft received within said cap and having an end portion abutting said sprag assembly, a cylindrical plunger received within said hollow shaft spring biased for movement along the axis thereof, said plunger having an annular elongated groove therein near the end portion thereof adjacent said sprag assembly, whereby in one displaced position the end portion of said plunger is received within and abuts one lip portion of said sprag assembly to rotate and maintain said sprags in an article engaging position and whereby in another displaced position of said plunger said one lip portion of said sprag assembly is received within said elongated groove to permit said sprags to rotate to an article disengaging position; and a cylindrical lock-on stud having one end thereof adapted to be secured to a weapon or store and having an annular semi-circular groove formed therein adjacent the other end thereof, the radius of said groove being approximately equal to that of the lip portions of said sprag assembly, said lock-on stud being adapted to be received through said cap aperture whereby said groove abuts and closely interfits with the other lip portion of said sprag assembly.

6. The combination of claim 4 wherein said plunger is spring biased toward said aperture and is provided with a longitudinal bore communicating with a lateral bore, and wherein there is further provided a plunger detent and release assembly comprising a ball detent disposed within said lateral bore and adapted to engage an annular recess in said hollow shaft, and a spring biased detent release member disposed in said longitudinal bore.

7. A sprag assembly comprising: a plurality of planar sprags each having a semi-circular body portion terminating in opposed semi-circular lip portions of radii less than that of said body portion, and means assembling said sprags to form an annulus wherein the sprags are free to rotate about an annular axis passing through the axes of said body portions.

8. A sprag assembly comprising: a plurality of planar sprags each having a semi-circular body portion terminating in opposed semi-circular lip portions of radii less than that of said body portion, said sprags being equally spaced about an annular axis passing through the axes of said body portion with the interstices therebetween being partly filled with a flexible material having good surface adhesion characteristics.

References Cited in the file of this patent

UNITED STATES PATENTS

| Number | Name | Date |
|---|---|---|
| 218,338 | Thomas | Aug. 5, 1879 |
| 2,279,310 | Gray | Apr. 14, 1942 |
| 2,448,817 | McArthur | Sept. 7, 1948 |
| 2,942,903 | Giladett | June 28, 1960 |
| 2,951,274 | Elsner | Sept. 6, 1960 |

UNITED STATES PATENT OFFICE
CERTIFICATE OF CORRECTION

Patent No. 3,043,614                                   July 10, 1962

Albert C. Eichmann

It is hereby certified that error appears in the above numbered patent requiring correction and that the said Letters Patent should read as corrected below.

Column 1, line 54, after "compact" insert a comma; column 2, line 49, after "surface" insert -- adhesion --.

Signed and sealed this 8th day of January 1963.

(SEAL)
Attest:

ERNEST W. SWIDER
Attesting Officer

DAVID L. LADD
Commissioner of Patents